(12) United States Patent
Hallock et al.

(10) Patent No.: US 6,792,210 B1
(45) Date of Patent: Sep. 14, 2004

(54) HYBRID OPTICAL ADD/DROP MULTIPLEXING DEVICES

(75) Inventors: Robert W. Hallock, Santa Rosa, CA (US); Michael A. Scobey, Santa Rosa, CA (US)

(73) Assignee: Optical Coating Laboratory, Inc., Santa Rosa, CA (US)

(*) Notice: Subject to any disclaimer, the term of this patent is extended or adjusted under 35 U.S.C. 154(b) by 675 days.

(21) Appl. No.: 09/644,417

(22) Filed: Aug. 23, 2000

Related U.S. Application Data

(63) Continuation-in-part of application No. 09/517,648, filed on Mar. 3, 2000, which is a continuation-in-part of application No. 09/511,693, filed on Feb. 23, 2000, which is a continuation-in-part of application No. 09/473,479, filed on Dec. 28, 1999.

(60) Provisional application No. 60/150,398, filed on Aug. 23, 1999.

(51) Int. Cl.[7] .................... H04J 14/00; H04J 14/02
(52) U.S. Cl. ................... 398/83; 398/84; 398/85; 398/87; 398/49; 398/45
(58) Field of Search .................... 398/85, 87, 83, 398/84, 45, 59, 49

(56) References Cited

U.S. PATENT DOCUMENTS

| | | | | |
|---|---|---|---|---|
| 4,930,854 A | * | 6/1990 | Albares et al. | 385/49 |
| 5,422,968 A | | 6/1995 | Hanatani et al. | 385/24 |
| 5,859,717 A | | 1/1999 | Scobey et al. | 359/124 |
| 5,905,824 A | * | 5/1999 | Delisle et al. | 385/15 |
| 5,930,016 A | | 7/1999 | Brorson et al. | 359/127 |
| 5,943,454 A | | 8/1999 | Aksyuk et al. | 385/22 |
| 5,953,141 A | | 9/1999 | Liu et al. | 359/124 |
| 5,974,207 A | | 10/1999 | Aksyuk et al. | 385/24 |
| 6,023,359 A | * | 2/2000 | Asahi | 398/5 |
| 6,195,186 B1 | * | 2/2001 | Asahi | 398/5 |
| 6,424,440 B1 | * | 7/2002 | Shimomura et al. | 398/82 |

FOREIGN PATENT DOCUMENTS

| | | | | |
|---|---|---|---|---|
| WO | WO 98/52306 | 11/1998 | | H04B/10/20 |
| WO | WO 99/13607 | 3/1999 | | H04J/14/02 |
| WO | WO 99/14879 | 3/1999 | | H04J/14/00 |
| WO | WO 99/38348 | 7/1999 | | H04Q/11/00 |
| WO | WO 99/41635 | 8/1999 | | G02F/1/13 |
| WO | WO 99/59281 | 11/1999 | | H04J/14/02 |
| WO | WO 01/13151 A1 | 2/2001 | | G02B/6/293 |

OTHER PUBLICATIONS

Senior, J., Devices for Wavelength Multiplexing and Demultiplexing, IEEE Proceedings, vol. 136, Pt. J, No. 3, pp. 183–202 (Jun. 1989).

* cited by examiner

*Primary Examiner*—M. R. Sedighian

(57) ABSTRACT

An optical component array that has essentially equal path loss for each channel routed through a switching node in a re-insertion configuration and the bypass channels. An array input carrying a plurality of optical channels is coupled to a first node input. Consistent, low transmission loss through a switching node is achieved by a single fiber-beam-fiber transition. The low transmission loss is summed with other array losses to be within 3 dB of the insertion loss of a bypass path. In a particular configuration, a routing array with three switching nodes is loss-balanced to the bypass path. In another embodiment, a multi-channel filter stub in the bypass path improves residual signal suppression when a node is switched to an add/drop configuration.

13 Claims, 6 Drawing Sheets

HYBRID OPTICAL ADD/DROP MULTIPLEXING DEVICES

CROSS-REFERENCE TO RELATED APPLICATIONS

This application claims priority from U.S. Provisional Patent Application No. 60/150,398 entitled HYBRID OPTICAL ADD/DROP MULTIPLEXING DEVICES, filed Aug. 23, 1999 by Michael A. Scobey and Robert W. Hallock, the disclosure of which is hereby incorporated in its entirety for all purposes; and also claims priority as a continuation-in-part patent application from co-pending, co-assigned U.S. patent application Ser. No. 09/517,648, entitled EXPANDABLE OPTICAL ARRAY, filed Mar. 3, 2000 by Kevin J. Zhang, Michael A. Scobey, and Robert W. Hallock; co-pending, co-assigned U.S. patent application Ser. No. 09/511,693, entitled HYBRID WAVELENGTH SELECTIVE OPTICAL ROUTER AND SWITCH, filed Feb. 23, 2000 by Michael Scobey and Robert W. Hallock; and co-pending, co-assigned U.S. patent application Ser. No. 09/473,479, entitled WAVELENGTH SELECTIVE OPTICAL SWITCH, filed Dec. 28, 1999 by Michael A. Scobey, Robert W. Hallock, Michael Cumbo, and Glenn Yamamoto, the disclosures of which are hereby incorporated in their entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention is generally related to optical networks, and in particular provides methods and apparatus for routing wavelength division multiplexed optical signals.

BACKGROUND OF THE INVENTION

Optical fiber networks are used in a variety of applications, such as optical tele-communication and data transmission systems. Optical fiber networks use optical fibers as transmission lines for carrying light signals. The light signals propagate down the fiber from one location to another, analogous to electrical signals traveling down a wire or cable from one location to another. Optical fibers are used in a variety of applications, such as metro access local loops and "long haul" transmission lines. Long haul transmission lines might carry signals between cities or across oceans, for example.

Optical fibers can carry a single channel, or many channels can be multiplexed onto a single fiber. Multiplexing is way of increasing the information-carrying capacity through an optical fiber. There are various ways to multiplex signals on an optical fiber or other type of transmission line, including time division multiplexing and wavelength division multiplexing ("WDM"). In a WDM system, a number of wavelength channels are carried on a single optical fiber. A channel is typically defined as a frequency (wavelength) of light that is modulated to carry information.

Optical WDM networks typically allocate a portion of the spectrum about a center frequency of the nominal channel wavelength for signal transmission. For example, channels might be spaced 100 GHz apart with ±12.5 GHz on either side of the channel center frequency in a particular system, thus providing the channel with a "width" of 25 GHz. The remainder of the inter-channel spectra allows for channel separation in order to reduce adjacent channel interference or "cross-talk".

Ideally, the channels could be separated from each other with filters that provided zero transmission loss of the channel and infinite transmission loss of light signals not within the channel. In other words, a filter characteristic (insertion loss versus wavelength) that had a "flat" top and "vertical" sides. However, actual filters have some insertion loss within the passband (selected channel), including passband ripple, and "skirts" that provide a slope to the out-of-band insertion loss versus wavelength. Furthermore, the filter characteristic can change, with humidity and temperature, for example. Therefore, nominal channel spacing is greater than channel width. Channel spacing of 100 GHz or less is commonly referred to as dense wavelength division multiplexing ("DWDM").

While some applications (i.e. optical transmission systems) might transmit all the optical signals in WDM system from one point to another, other applications might select a channel or number of channels to be handled differently from the rest. For example, an optical signal occupying a channel might be dropped off a multi-channel optical fiber and provided to a user. It is often desirable to add another optical signal or "payload" occupying the same channel as the dropped signal to utilize the carrying capacity of the optical fiber. This action is known as optical add/drop multiplexing ("OADM"). However, OADM present a number of challenges. First, different optical routing paths might create different amounts of loss for different channels. In order to keep the signal strength of all channels about the same, for broadband amplification or other signal processing, for example, differential attenuation or amplification (i.e. varying the signal strength of one channel with respect to another) might be performed.

Another design challenge is to provide add/drop filters with sufficient in-band flatness and insertion loss while providing high out-of-band rejection. While dielectric thin-film filters provide relatively good rejection and passband flatness, optical telecommunication system requirements can be difficult to achieve with a single filter. A dielectric thin-film filter typically uses alternating layers of high and low (relative to each other) dielectric material, such as metal oxides, of a selected thickness, such as a quarter wavelength or a half wavelength thickness. Variations in the layer thickness(es), composition of the dielectric material, design compromises (such as passband width) and other variables result in an actual filter that does not equal the performance of the designed (hypothetically perfectly fabricated) filter, which again cannot meet the ideal square-top filter shape. Thus, both insertion loss and out-of-band rejection of actual filters are less than ideal.

Insertion loss is important for at least two reasons. First, it is desirable to pass (drop) the desired optical signal or channel(s) through the filter with minimal loss. Second, a particular type of cross talk can occur during OADM, namely the residual signal from the dropped channel can interfere with the added channel, which is at the same wavelength. That is, some of the dropped channel remains on the expressed signal.

Thus, it is desirable to provide optical routing networks that are loss balanced and provide low residual signals for use in OADM WDM systems.

SUMMARY OF THE INVENTION

The present invention provides an optical routing array with low insertion loss for re-inserted channels and a bypass path that has similar insertion loss. In one embodiment, the optical routing array has four switching paths and one bypass path, but applies to more or fewer paths. Each of four switching paths is routed from a common optical input and to an array optical output with a similar number of transmission and reflection losses. The bypass path carries bypass channels that are not routed through one of the switching paths in the array, but are coupled from the input to the output. The bypass path loss is within about 3 dB of each of the four switching paths when in the re-insertion configuration. In one embodiment, each of the four optical paths carries an optical channel of a WDM optical signal. In another embodiment, at least one of the optical paths carries a number of adjacent optical channels of a WDM optical signal. In a further embodiment, each of the four optical paths carries a number of adjacent optical channels of a WDM optical signal. In still a further embodiment, each of the four optical paths carries the same number, N, of adjacent optical channels of a WDM optical signal, where the total number of optical channels carried on the WDM system is the number of paths (i.e. four) times N.

In another embodiment, a stub filter is added to an optical routing array to reduce the residual signals reflected from the inputs of an add/drop nodes. An add/drop node typically has two wavelength-selective filters reducing residual signal between the common input and the array output when a bypass path between the input side and the output side of the array is provided. The addition of the filter stub provides a third wavelength-selective filter to reduce the strength of residual signals. In one embodiment, the filters in the routing node (i.e. switchable path) and the filter stub are bandpass filters. In another embodiment, the input and output filters of the routing node are bandpass filters and the stub filter is a band-edge filter. Each filter provides between about 12–17.5 dB of suppression. Generally, each of the three filters do not have the same amount of suppression, hence the cumulative suppression can vary. The three wavelength-selective filters provide a cumulative suppression of the residual signal(s) on the array output of greater than 36 dB. In another embodiment the cumulative suppression sums to about 45 dB, and in another embodiment up to about 53 dB.

DETAILED DESCRIPTION OF THE INVENTION

I. Introduction

The present invention provides an optical routing system for use in WDM optical transmission systems. In one embodiment, the residual signal from a channel or group of contiguous channels is decreased by concatenating wavelength-selective filters. Loss balancing through the array is achieved by a routing topology that provides essentially the same loss for each path, including a bypass path, thus avoiding the need for amplitude adjustment between signals.

II. Components for Optical Routing

Figure 1A:
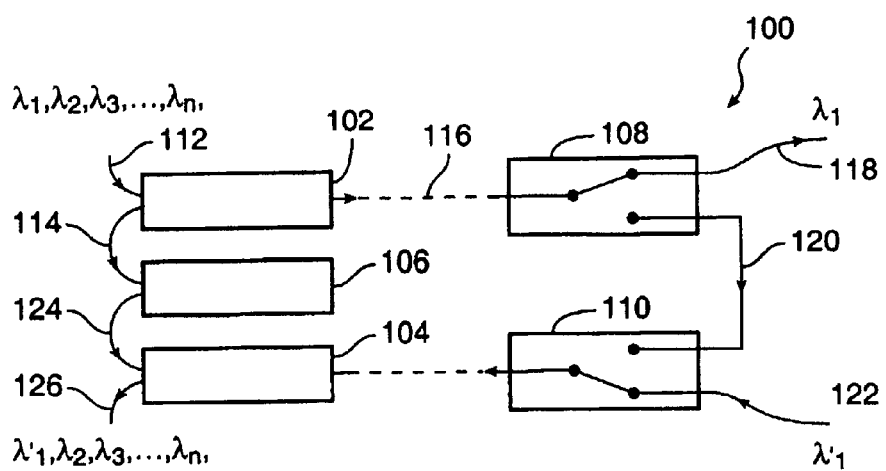
FIG. 1A is a simplified diagram of an add/drop node with a stub filter according to an embodiment of the present invention.

FIG. 1A is a simplified diagram of an optical add/drop node 100 according to an embodiment of the present invention. For purposes of discussion, the term "node" will refer to a switchable path for a selected channel(s) or wavelength (s) that allows the selected channel(s) to be re-inserted or routed to another destination. Although an add/drop node is used as an example, it is understood that other operations, such as dispersion compensation or signal level adjustment (amplification or attenuation), could be performed on the selected signal(s). In other words, it is not necessary to drop one signal and replace it with another signal on the same channel.

The node includes two add/drop filter modules 102,104 and an optional stub filter module 106. The node also includes two opto-mechanical switches 108, 110 that are shown as 1×2 switches for purposes of illustration and convenience of discussion. Those skilled in the art will appreciate that optical switching is different from electronic switching, the former generally involving directing an optical signal along one of two paths, while the latter typically involves making physical contact between selected conductors. Generally, each of the opto-mechanical switches includes a collimator on the input to expand the light carried on the fiber into an optical beam, which is switched with a movable mirror, for example, and another collimator on each of the output ports to focus the optical beam back onto a fiber after switching.

A common input waveguide 112, such as an optical fiber, provides a plurality of optical channels $\lambda_1, \lambda_2, \lambda_3, \ldots, \lambda_n$ to the drop filter module 102. The drop filter module transmits a selected channel, $\lambda_1$, to the first switch 108 and reflects the remainder of the plurality of channels, $\lambda_2, \lambda_3, \ldots, \lambda_n$ to the stub filter module 106 through an intermediate common optical fiber 114. It is understood that each channel generally occupies a portion of the optical spectrum, but is referred to as a wavelength (typically the center-channel wavelength) for ease of discussion. The path from the drop module 102 to the first switch 108 is shown as a dashed line 116 to represent that other operations, such as amplification or dispersion compensation, can be performed between these components. The first switch can route the selected channel, $\lambda_1$, to a drop port 118 or to a re-insertion port 120. The first switch generally operates in conjunction with the second switch 110, which can switch between the re-insertion port 120 and an add port 122.

The stub filter module includes a filter (not shown) that also transmits optical signals at $\lambda_1$ while reflecting the remainder of the plurality of channels. The stub filter can be a band-edge filter, such as a high-pass or low-pass filter, if the transmitted optical channel is on one end of the band or the other, or a band-pass filter, for example.

The wavelengths reflected off the stub module 106 are provided to the add module 104 on an optical fiber 124. The add module typically includes a filter similar to the filter included in the drop module. The add port 122 provides an optical signal or add payload, $\lambda_1'$, through the second switch 110 to occupy the portion of the optical spectrum freed by dropping the payload carried at the selected channel wavelength, $\lambda_1$, on the common input 112. Thus, the dropped payload and the added payload occupy essentially the same optical band.

There are at least two and possibly three wavelength-selective filters between the common input 112 and the array output 126, each of the filters transmitting most of the optical signal at the selected wavelength(s). Each filter module undesirably reflects some of the optical signal that should be transmitted. Some of the reflection occurs off of the actual filter element within the module, and some off of other optical elements in the module, such as collimating lenses or fiber ends. For example, a filter module might have a residual reflection specification of between about −12 to −17.5 dB below zero insertion loss. Thus, the drop filter module provides a reflected residual signal about 12–17.5 dB below the incident signal that is transmitted through the coupler, the stub filter module provides an additional −12 to −17.5 dB, and the add filter module provides yet an additional −12 to −17.5 dB, thus the residual reflection from the common to the express is suppressed by about 36 to 52.5 dB. Concatenating these three filters thus provides residual reflection that could be very difficult to obtain in a single filter, especially while maintaining other filter characteristics, such as pass-band shape.

A switching node according to FIG. 1A typically has 11 collimators: three in each switch component, two in each 3-fiber coupler, and one in the stub. The loss through each 3-fiber coupler is about 1.5 dB and the loss through each switch is about 0.8–1 dB. Thus the loss for a re-inserted signal from the common 112 input to the express 126 output is about 4.6–5 dB. The loss for expressed signals (e.g. $\lambda_2$) is three times the out-of-band reflection loss for both couplers and the stub, or about 0.6 dB. Without the stub the loss for an expressed signal is about 0.4 dB. Thus, the difference in loss between a re-inserted signal and an expressed signal is about 4.2–4.6 dB without the stub and about 4–4.4 dB with the stub. Thus, the stub not only improves residual signal suppression, but also more closely balances the path losses between the re-inserted path and the express path.

Figure 1B:
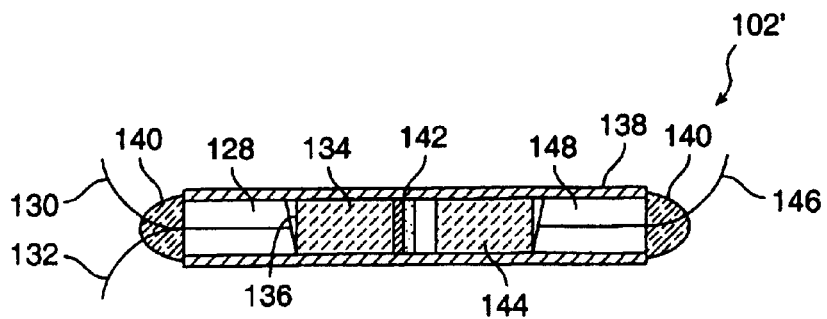
FIG. 1B is a simplified cross section of an add/drop filter assembly used in the add/drop node of FIG. 1A.

FIG. 1B is a simplified cross section of an add/drop filter assembly 102', or three-port coupler, that could be used in the add/drop node of FIG. 1A. The assembly includes a 2-fiber ferrule 128 holding a first fiber 130 and a second fiber 132 in position relative to a first collimator 134, such as a gradient-index of refraction ("GRIN") lens. The ferrule is typically angle-lapped, shown as an angled face 136 to reduce back reflection. The ferrule 128 and collimator 134 are contained within a sleeve 138, such as a metal tube and are fixed in place with epoxy cement, flux-less solder, or by precision welding, for example. The fibers 130, 132 are typically held in place with epoxy 140. The collimator essentially expands the light signal carried on the first fiber 130 from the end of the fiber to a beam approximately 400 microns in diameter, or can focuses a light beam onto a fiber end with proper optical alignment and assembly.

A wavelength-selective filter 142 is mounted on the first collimator 134, but could be mounted on the second collimator 144. The filter is typically a stack of dielectric thin films deposited on a glass substrate, but the thin films could be deposited directly on the collimator. Additional coatings, such as anti-reflective coatings, could be applied to the ends of the collimator, for example. The filter transmits a selected channel from the first fiber 130 to a third fiber 146 held in a second ferrule 148. The second collimator 144 focuses the transmitted beam onto the end of the third fiber 146. The filter 142 reflects optical signals at other wavelengths back through the first collimator 134, which focuses these optical signals onto the end of the second fiber 132. In one embodiment, the sleeve 138 is about 5 mm in diameter, the transmission loss between the first fiber 130 and the third fiber 146 is about 1.5 dB, and the transmission loss between the first fiber and the second fiber 132 is about 0.2–0.5 dB (for non-selected, i.e. reflected, wavelengths).

Figure 1C:
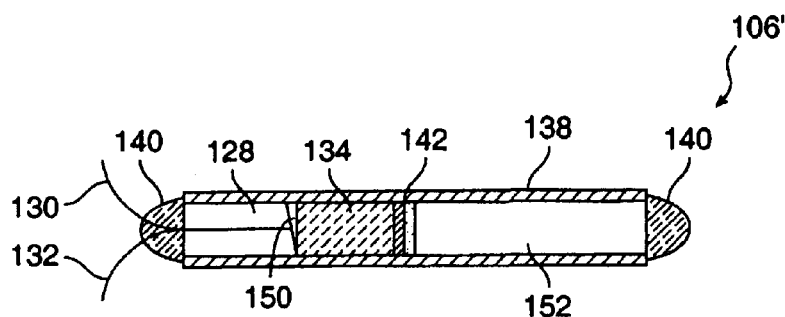
FIG. 1C is a simplified cross section of a stub filter assembly used in the add/drop node of FIG. 1A.

FIG. 1C is a simplified cross section of a stub filter assembly 106' for use in the add/drop node of FIG. 1A. Many of the elements of the stub filter assembly are similar to those used in the add/drop filter assembly, such as a sleeve 138 containing a 2-fiber ferrule 128 holding a first fiber 130 and a second fiber 132. The stub filter assembly has only a first collimator 134 and a wavelength-selective filter 142 illuminated by light through the collimator. The ends of the sleeve are typically sealed with epoxy or similar material 140. The gaps 150, 152 of this or the add/drop filter assembly can be filled with air or other gas, liquid, or transparent solid, such as clear epoxy or other plastic. Not all gaps need to be intentionally filled, or filled with the same material.

A light signal arriving on the first fiber 130 is expanded by the collimator 34 and illuminates the filter 142. The filter transmits a selected portion of the optical band to terminate within the interior of the sleeve, and reflects the remaining portion of the light signal to the second fiber 132. The insertion loss for the reflected signals is about 0.2–0.5 dB, and at least about 12.5 dB for the transmitted signals. In another embodiment, the insertion loss (also known as the isolation depth) for the transmitted signals is about 15 dB, and in yet another embodiment, the isolation depth is about 17.5 dB.

III. An Optical Routing Array

Figure 2A:
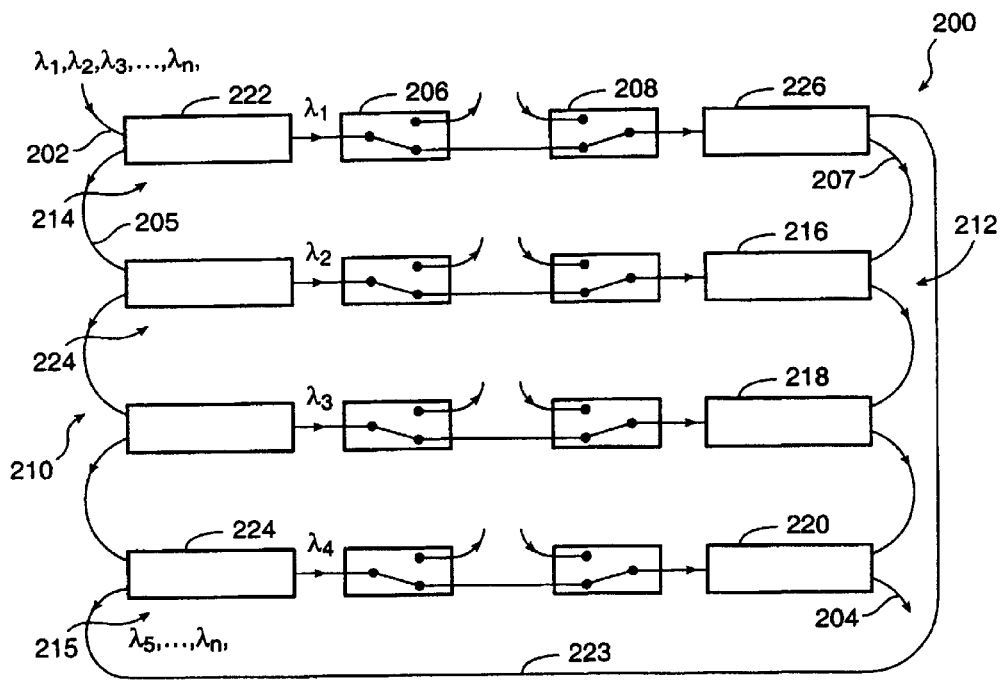
FIG. 2A is a simplified diagram of a loss-balanced optical routing array according to another embodiment of the present invention.

FIG. 2A is a simplified diagram of an optical routing array 200 using three-port couplers, such as are shown in FIG. 1B, in a cascade. In this array, the common input 202 provides a plurality of optical channels $\lambda_1, \lambda_2, \lambda_3, \ldots \lambda_n$ to the input of the "first" node 214, while the array output 204 comes off of the output of the "last" node 215. Each channel (in the re-insertion configuration) is subjected to essentially the same loss from the common input to the array output through the routing array. The switches in the routing array, for example the first 206 and second 208 switch in the switchable path for $\lambda_1$, are shown in the re-insertion configuration, that is, the channel is not dropped from the common signal, but rather re-inserted back onto the express signal.

The path loss of the first channel, $\lambda_1$, between the common input and the array output includes the transmission loss through the first node 214, which is between about 4.6–5 dB in one embodiment, in addition to the reflection losses from the other three output couplers 216, 218, 220, which is about 3×0.2 dB or 0.6 dB, for a total re-insertion path loss between the array input and the array output of about 5.2–5.6 dB. In another embodiment, the refection loss for out-of-band signals is about 0.4 dB. The path loss of the second channel, $\lambda_2$, includes the reflection loss from the first input coupler 222, the transmission loss through the second node 224, and the reflection losses from the two "lower" output couplers 218, 220. The input to the second node is connected to the input of the first node with an intermediate common fiber 205. Similarly, the output from the first node is connected to the output of the second node with an intermediate express fiber 207.

Thus the first and second channel both have a re-insertion path loss that includes a transmission loss through an add/drop node and three reflection losses off of three wavelength-selective filters. The other through (re-insertion) paths have similar path losses, i.e. one transmission and three reflection losses. It is understood that each filter might have a slightly different reflection loss, and each node might have a slightly different insertion loss. The bypass channels $\lambda_5, \ldots, \lambda_n$ routed through the bypass fiber 223 incur about 8×0.2 dB of loss, or about 1.6 dB of loss. Thus, the difference in loss between a re-inserted channel and a bypass channel is about 3.6–4.0 dB for the exemplary losses given.

In a particular embodiment, four channels are carried on the common fiber, each channel following a different path. In another embodiment, sixteen channels are carried on the common fiber, and each path (node) handles a segment of the common band having four adjacent channels. Thus, the pass-bands for the filters in the input and output modules (couplers) are essentially four times as broad as for a single channel with a given channel spacing. Splitting the input band into four segments allows each segment to be loss-balanced with respect to the other segments. It is not necessary that each segment have the same number of channels.

Figure 2B:
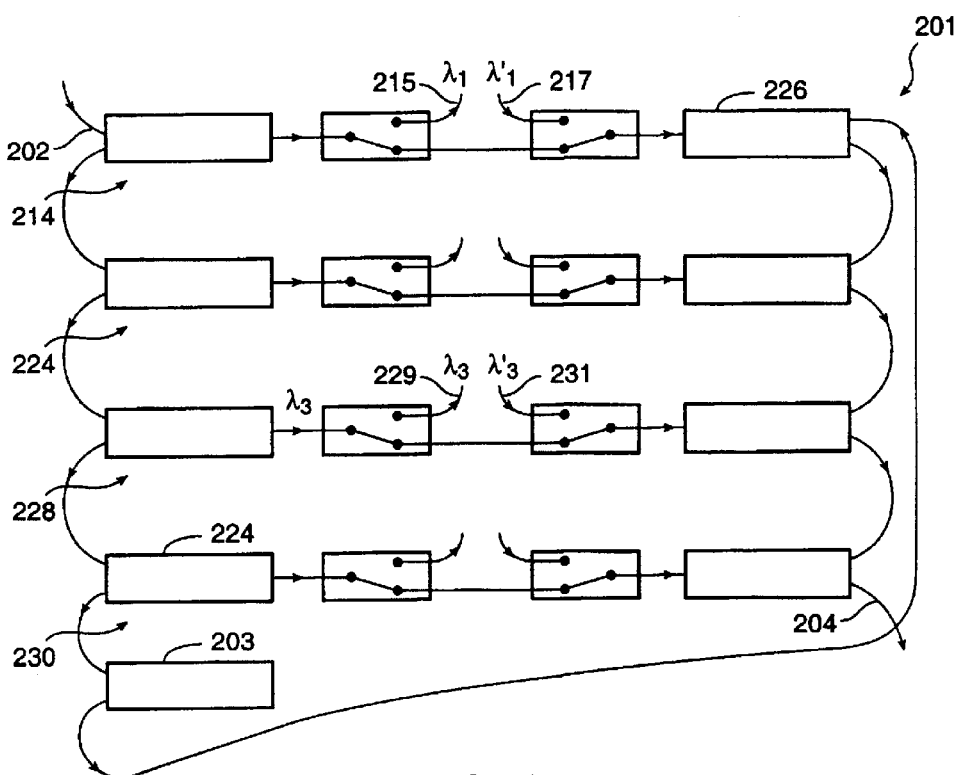
FIG. 2B is a simplified diagram of a loss-balanced optical routing array with a multi-band stub to reduce the residual signals of several channels.

IV. A Multi-Channel Filter Stub for Residual Signal Suppression in a Routing Array FIG. 2B is a simplified diagram of an optical routing array 201 with a multi-band stub 203 that reduces the residual signals of several channels according to an embodiment of the present invention. The first node 214 is configured to drop $\lambda_1$ at the first drop port 215 and to insert $\lambda_1'$ at the first add port 217. What is dropped is a first optical payload (i.e. information on the optical signal) carried at the channel wavelength(s). What is added is a second optical payload generally carried at the same channel wavelength(s). Thus, "$\lambda_1$" and "$\lambda_1'$" are used to refer to these different optical payloads. The second node 224 is configured to re-insert $\lambda_2$. The third node 228 is configured to drop $\lambda_3$ at the third drop port 229 and to insert $\lambda_3'$ at the third add port 231. The fourth node 230 is configured to re-insert $\lambda_4$. The multi-band stub thus reduces the residual reflections for $\lambda_1$ and $\lambda_3$ so that the reflections do not interfere with $\lambda_1'$ and $\lambda_3'$.

For example, the filter in the first 3-port input coupler 222 typically has between about 12–17.5 dB residual signal suppression for in-band signals, which is undesirable if the signal is to be dropped and another added on that channel. Similarly, the filter in the first 3-port output coupler 226 typically has between about 12–17.5 dB reflection loss for in-band signals. Thus, without the stub 203, there might be as little as 24 dB of rejection of the dropped optical signal, $\lambda_1$, from the added optical signal, $\lambda_1'$. By routing the bypass signals, which include the residual signals, through the stub, an additional 12–17.5 dB of isolation can be achieved, bringing the total isolation to at least about 36–52.5 dB. Generally, the cumulative isolation is between these values, such as about 45 dB, due to randomly selecting each filter from a distribution arising in manufacturing. In other embodiments the specified suppression of each filter may be more closely matched to achieve a particular cumulative suppression. The re-inserted channels are essentially unaffected by the multi-band stub, while the express channels, including the bypass signal(s), are reduced by an additional 0.2 dB to lower the loss difference between a bypass channel and a re-inserted channel to about 3.4–3.8 dB.

Alternatively, four individual stub assemblies (not shown) could be provided; however, using a single stub for all channels uses fewer components, such as collimators, ferrules, sleeves, and filters, and requires much less assembly. Similarly, the insertion loss of the express signals for a single stub is less than if four separate stubs were used. Finally, placement of the multi-band stub, or even several stubs, in the express bypass path improves the loss-balanced nature of the optical routing array while providing enhanced residual signal suppression for add/drop channels. In a particular embodiment, all the channels routed through the array are adjacent to each other and the multi-band stub 203 has a single passband. Alternative filters with multiple passbands could be used if the channels routed through the array are not contiguous. A more lossy filter or a broad-band attenuator could be placed in the bypass path to even out the path loss with a re-inserted channel, but it is generally preferable to lower the re-insertion path loss.

Figure 2C:
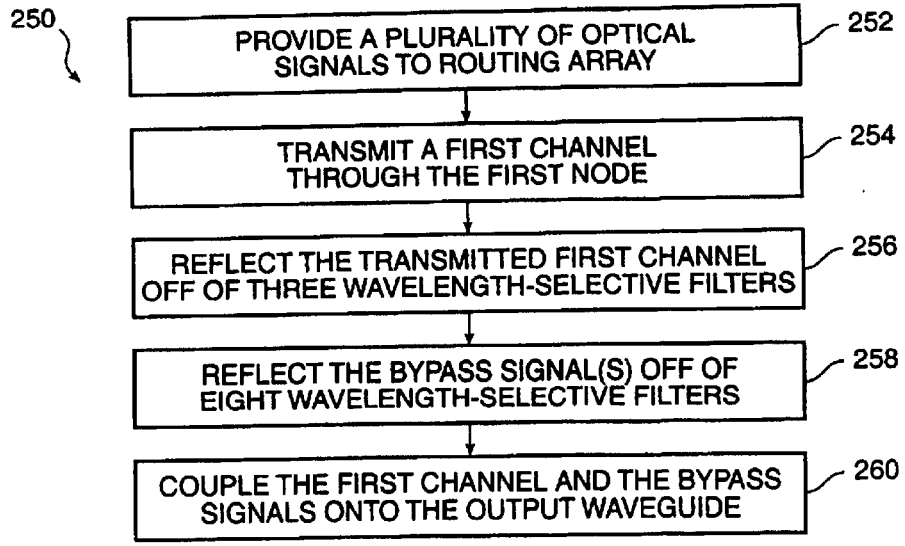
FIG. 2C is a simplified flow chart of a process for routing re-inserted optical signals according to an embodiment of the present invention.
Figure 4:
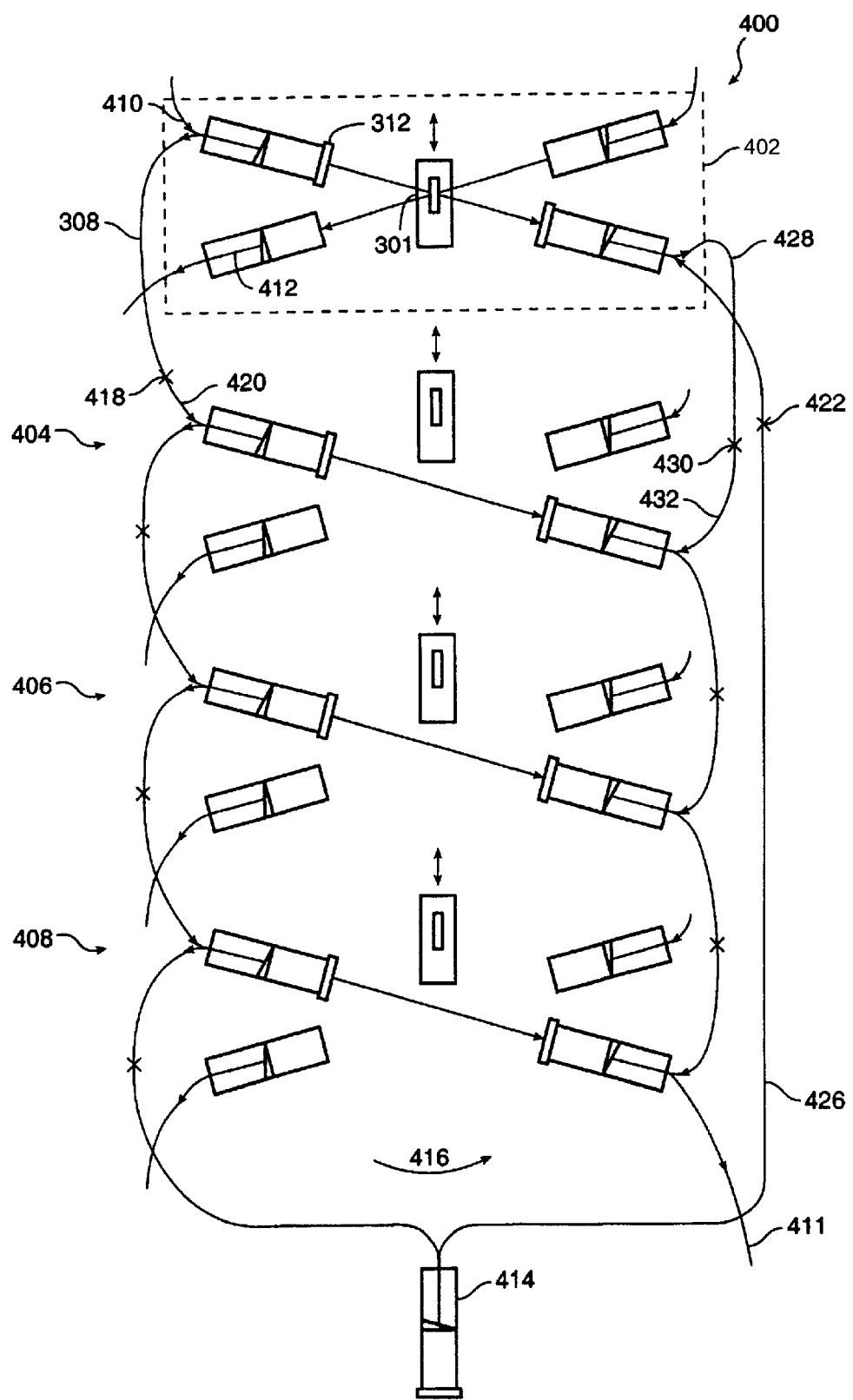
FIG. 4 is a simplified diagram of a loss-balanced optical routing array with a multi-band stub filter according to another embodiment of the present invention.

FIG. 2C is a simplified flow chart of a process of routing optical signals 250 according to an embodiment of the present invention and may be better understood in reference to FIG. 4. In this embodiment, a re-inserted channel has a path loss nearly equal to the path loss of a bypass signal(s). Many of the steps occur essentially concurrently because the speed of light is so high, thus the order of the steps is provided merely for purposes of discussion. While this flow chart describes an optical routing array with four wavelength-selective paths, it is understood that an optical routing array might have additional or fewer wavelength-selective paths.

A plurality of optical channels is provided on a common input waveguide (step 252). The first node transmits the first channel or group of adjacent channels to a first node output and reflects a first remainder of the plurality of optical channels (step 254), typically to a second node input. The transmission loss through the node is less than about 2.5 dB because the light signal is only expanded and focused once, as discussed in reference to FIG. 3C, below, rather than two or three times as in other switching nodes, such as illustrated in FIG. 1A. The first channel is then reflected off of a number of wavelength-selective filters, for example 3 filters in a switching array with four switching paths (step 256). The bypass signal(s) is reflected off of the input of the first node, and is reflected an additional 7 times (step 258). The first channel and the bypass signal(s) are both coupled onto an output waveguide output (step 260) where the difference in the insertion loss for the re-inserted signal and the bypass signal from the array input to the array output is less than about 3 dB. Loss balancing is achieved by the low insertion loss through a switching path achieved by utilizing a single fiber-beam-fiber transition in the switch path, and further by the reduced uncertainty resulting from the reduction in components and transitions.

Figure 2D:
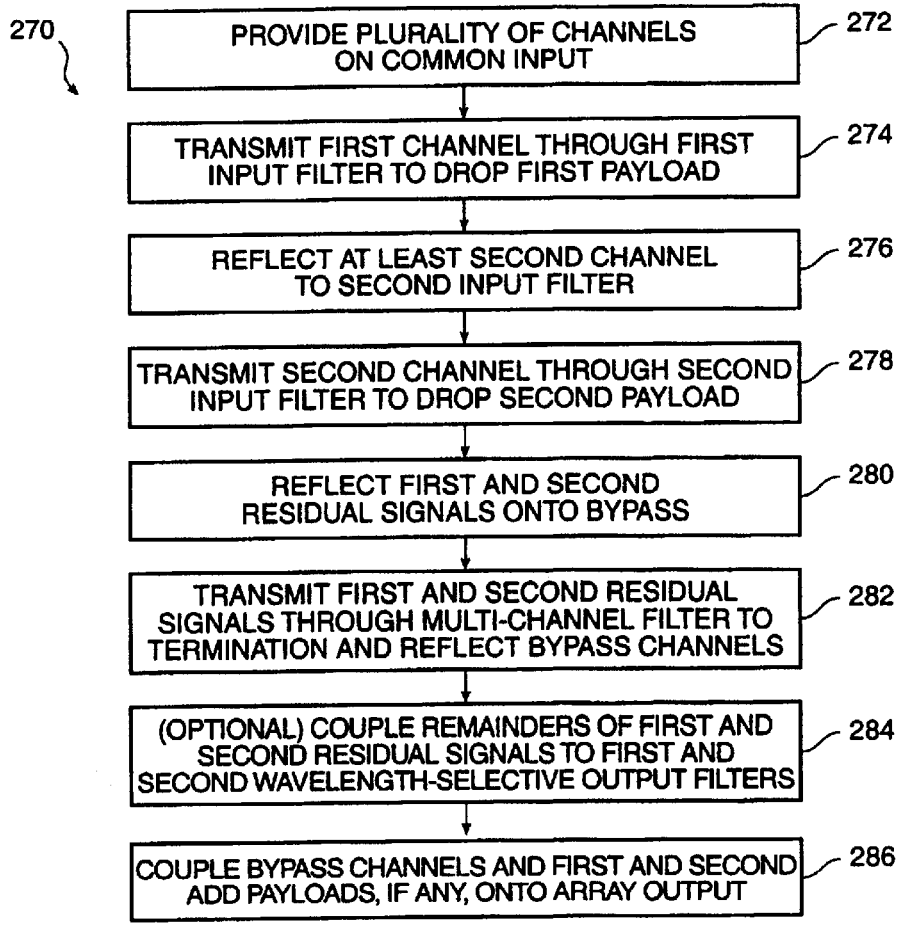
FIG. 2D is a simplified flow chart of a process of reducing residual signals in an add/drop optical routing array according to another embodiment of the present invention.

FIG. 2D is a simplified flow chart of a process of reducing residual signals 270 in an add/drop optical routing array. It is generally desirable to reduce residual signals when a first payload at a first optical channel is dropped and a second payload is added, rather than when a node is in a re-insertion configuration. A plurality of channels is provided on a common input waveguide (step 272) to an optical routing array. A first channel drop payload is transmitted through a first wavelength-selective input filter (step 274) to a first drop port. The first wavelength-selective input filter reflects a first remainder of the plurality of channels, including a first residual signal, a second channel, and a bypass channel, to a second wavelength-selective input filter (step 276). The second wavelength-selective input filter transmits a second channel drop payload to a second drop port (step 278), and reflects at least a second residual signal, the first residual signal, and a bypass signal(s) onto a bypass waveguide (step 280). It is understood that the terms "transmit" and "reflect" are used to mean that essentially the entire signal is transmitted or reflected unless otherwise indicated. For example, it is understood that there will be some incidental reflection loss of the first residual signal off of the second wavelength-selective input filter.

The bypass waveguide couples the first and second residual signals to a multi-band filter stub that transmits the first and second residual signals to an optical termination, such as a void in the filter stub (step 282), and reflects the bypass signal(s) and remainders of the first and second residual signals optionally to first and second wavelength-selective output filters (step 284), where the residual signals are further reduced, and then to the output of the routing array (step 286). The first and second output filters generally pass the first and second channel, respectively, as do the first and second input filters.

V. Hybrid Add/Drop Filter Switch

Figure 3A:
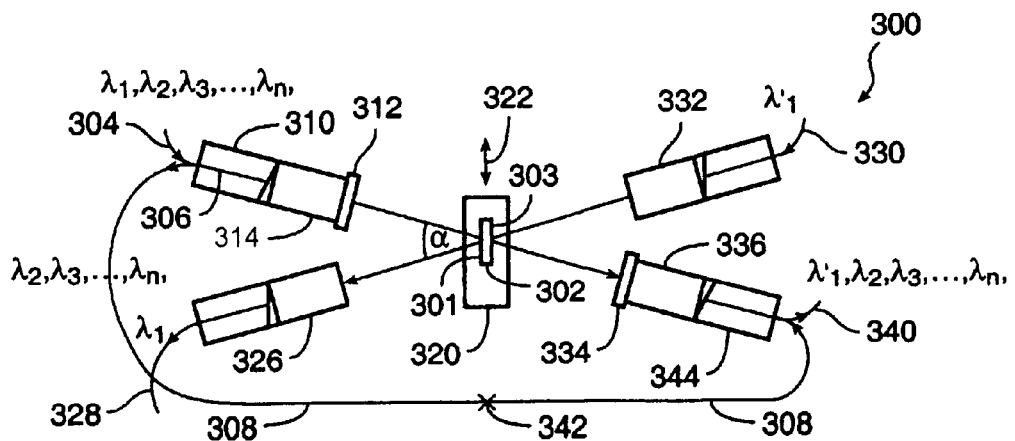
FIG. 3A is a simplified top view of an add/drop module using a single switching element.

FIG. 3A is a simplified top view of a hybrid add/drop switch 300, or node, with a single switching element 302 in an add/drop configuration. The elements of the node are typically packaged together and include other components, such as the mirror actuator and control circuitry that are not shown for clarity of illustration, as several examples are well known in the art. A common fiber 304 provides an input signal, $\lambda_1, \lambda_2, \lambda_3, \ldots, \lambda_n$ to the node. The common fiber and a first end 306 of a bypass fiber 308 are held in a first 2-fiber ferrule 310. A first wavelength-selective filter 312 is placed between the first collimator 314 and the switch element 302, which in this case is a double-sided mirror mounted on a movable arm 320 that moves the mirror(s) in and out of the light beam from the first collimator as shown by the double-ended arrow 322. The first wavelength-selective filter 312 transmits the selected channel, $\lambda_1$, and reflects the other channels to the bypass fiber 308.

The selected channel is reflected off of the first mirror side 301 to a drop collimator 326 that focuses the dropped channel onto the drop fiber 328. The angle, $\alpha$, between the input beam and the drop beam is preferably about 28 degrees. An add fiber 330 provides an add signal $\lambda_1'$ to the add collimator 332. The add signal is reflected off of the second mirror side 303 through a second wavelength-selective filter 334 to the output collimator 336. The second wavelength-selective filter reflects the non-selected channels, $\lambda_2, \lambda_3, \ldots, \lambda_n$ coupled through the bypass fiber 308 and transmits the added channel $\lambda_1'$ onto the express fiber 340. The bypass fiber may be spliced 342 from two "pigtail" fiber ends from the first 2-fiber ferrule 310 and the second 2-fiber ferrule 342, or may be assembled as a single fiber without a splice. As discussed in further detail below in relation to FIGS. 3B, 3C, and 4, the bypass fiber may be cleaved or the pigtails spliced to include a stub filter or form a loss-balanced array with or without splicing.

The node achieves switching with fewer transitions between an optical fiber and an optical beam than the nodes shown in FIG. 2A (e.g. ref. num. 214). Similarly, fewer components are used, particularly collimators, which are reduced from 11 to 4. For example, in a re-insertion configuration, a light signal carried on the input fiber 304 is expanded into a light beam, filtered by the first filter 312, passed as a light beam to the second filter 334 and focused onto the output fiber 340. Expanding and focusing the light signal a single time not only reduces the insertion loss, but also reduces the variation, or uncertainty, in the insertion losses for the node, or between nodes, compared to the multiple expansion and focusing described above in reference to FIG. 2A. The total path loss between the input fiber 304 and output fiber 340 is generally between about 1.2–2.5 dB for a re-inserted optical signal, versus between about 4.6–5 dB for an add/drop module built with discrete components.

The movable arm is actuated by any of a number of means that are known in the art, such as a solenoid. A suitable switch mechanism is described in co-pending, co-assigned U.S. patent application Ser. No. 09/454,022 entitled OPTICAL SWITCH WITH FLEXURE PIVOT by Richard Ian Seddon, the disclosure of which is hereby incorporated in its entirety for all purposes.

Figure 3B:
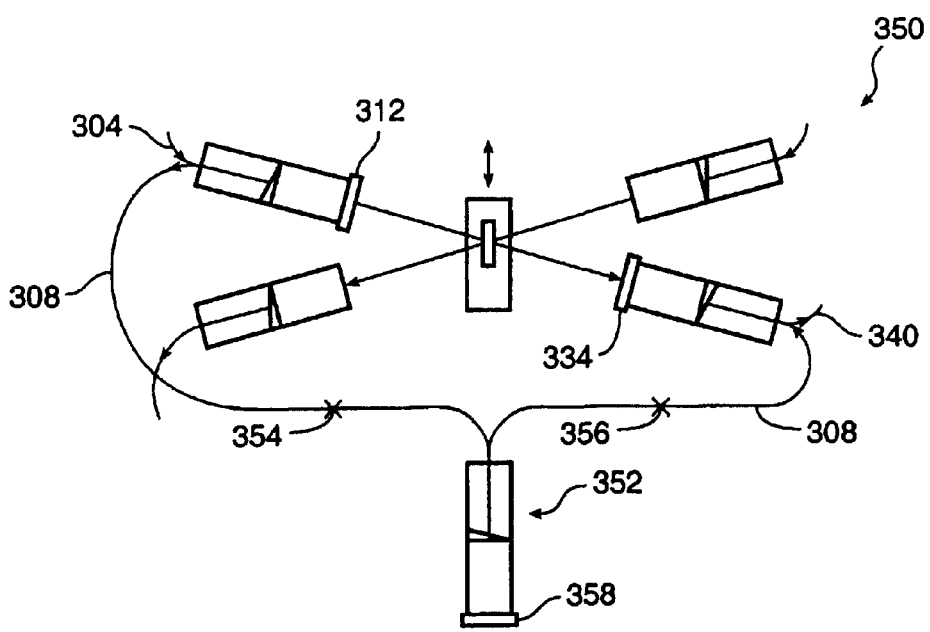
FIG. 3B is a simplified top view of an add/drop module incorporating a stub.

FIG. 3B is a simplified top view of a hybrid add/drop switch 350 in the add/drop configuration with a filter stub 352 incorporated into the bypass path. The filter stub can be a filter stub assembly as described above in conjunction with FIGS. 1A and 1C, for example. A pair of splices 354, 356 is used to join the filter stub to the bypass fiber 308. In another embodiment, the halves of the bypass fiber are assembled directly into the 2-fiber ferrule of the stub without splices. The filter stub includes a third wavelength-selective filter 358 that acts in conjunction with the first and second wavelength-selective filters 312, 334 to reduce the residual signal from the dropped channel, $\lambda_1$. In a particular embodiment, each of the first, second, and third wavelength-selective filters provide a residual signal between about −12 to −17.5 dB down from zero insertion loss, thus the residual signal strength of $\lambda_1$ on the express fiber 340 is about −36 to −52.5 dB less than the strength of $\lambda_1$ provided on the common fiber 304.

Figure 3C:
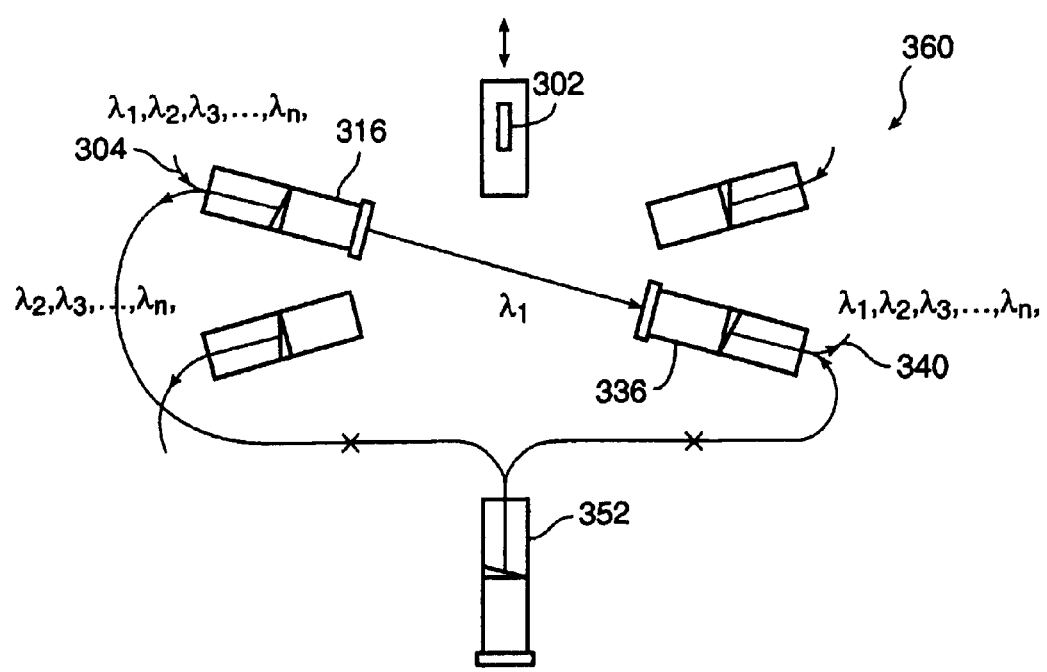
FIG. 3C is a simplified top view of the add/drop module of FIG. 3B in a re-insertion configuration.

FIG. 3C is a simplified top view of the hybrid add/drop switch 360 illustrated in FIG. 3B in the re-insertion configuration. The switch element 302 is removed from the light beam path of the selected channel, $\lambda_1$, which is transmitted from the first (common) collimator 316 to the express collimator 336. The filter stub 352 has negligible effect on the re-inserted signal, and adds a small amount of loss to the non-selected channels. In a particular embodiment, the strength of the selected channel signal on the express fiber 340 is about 1 dB less than the strength of the selected channel signal on the common fiber 304, although higher losses are possible. Generally, it is desirable that the difference in loss is less than about 2.5 dB.

VI. Loss-Balanced Routing Array with Hybrid Filter Switches

FIG. 4 is a simplified diagram of a number hybrid optical switches arranged in a loss-balanced optical routing array 400. The hybrid optical switches combine wavelength-selective filtering with optical beam switching and provide a routing array with fewer optical elements compared to a routing array with discrete 3-port couplers and 3-port switches, such as is illustrated in FIG. 2A. Similarly, the loss through each path is closer to the losses through the other paths because of lower path losses and reduced path loss uncertainty. Although the hybrid switches shown are similar to those shown in FIG. 3A, it is understood that other switch configurations could be used. For example, each hybrid switch could include a 3-fiber input ferrule holding the common, drop, and bypass fibers, and a 3-fiber output ferrule holding the express, add, and bypass fibers. The mirror would thus reflect the add and drop signals back to the input and output collimators, which would focus the signals on the appropriate fiber ends. Similarly, other switch configurations could be used with appropriate switch configuration and optical alignment.

The loss-balanced optical routing array has four add/drop nodes 402, 404, 406, 408. The first add/drop node 402 is in the add/drop configuration, and the remaining three nodes are in the re-insertion configuration. The common fiber 410 provides a plurality of optical channels to the first node. The first wavelength-selective filter 312 transmits the drop channel to the first mirror surface 301, which reflects the drop channel to the drop port 412. The remaining channels and the residual signal of the first drop channel are reflected off the first wavelength-selective filter 312 to the second node 404. As described above in reference to FIG. 2A, each of the channels that is re-inserted is reflected off of three wavelength-selective filters and passes through one re-insertion switch path before being output on the express fiber 411.

However, the difference in path loss for a reinserted signal and a bypass signal is much less, and in one embodiment essentially zero. As a nominal example omitting the stub and splice losses, the out-of-band reflection loss off of each wavelength selective filter is about 0.2 dB. Thus, a bypass signal is reduced by 8 reflections, or by about 1.6 dB. The transmission loss through a switching node is about 1.2–2.5 dB, to which three reflection losses, or 0.6 dB is added, for a total re-insertion path loss of between about 1.8–3.1. The difference in path loss between a bypass signal and a re-inserted signal is between about 0.2–1.5 dB. It is desirable that the difference be less than about 3 dB to avoid the need for amplitude correction (attenuating the higher signal(s) and/or amplifying the lower signal(s)).

In another embodiment accounting for eight splices, one in each intermediate express and intermediate output fibers each splice contributing about 0.1 dB of loss to all signals, the bypass loss increases to about 2.4 dB and the re-insertion loss increases to about 2.1–3.4 dB. In some instances the splice loss is as low as about 0.02 dB per splice, hence the cumulative loss arising from the splices could be less. Thus, the path difference is reduced to about −0.3 to 1 dB. This configuration allows for a condition where the bypass path loss is equal to a re-insertion path(s) loss, namely, when the transmission loss through a switching node is about 1.5 dB.

In yet another embodiment accounting for the multi-band stub and an additional two splices, the bypass path loss increases by about 0.4 dB to about 2.8 dB while the re-insertion path loss remains the same as in the previous example. Thus the difference between the bypass path and a re-insertion path is about −0.7–0.6 dB. If splices are omitted, the path loss difference is about 0–1.3 dB.

Generally, an insertion loss of 1.5 dB is easier to attain than a lower insertion loss, and a lower insertion loss is generally more desirable because it attenuates the signal less; however, in some applications it may be desirable to select the insertion loss of a switching node to achieve a selected loss balance, even if it results in a higher insertion loss for an individual component or set of components. The above examples are given for purposes of illustration only, and those of ordinary skill in the art will appreciate that other values may be used without departing from the spirit of the examples.

A multi-channel filter stub 414 is placed in the routing array bypass path 416 to reduce the residual signal strength of any channel dropped from the common input. The filter stub transmits signals at any of the wavelengths passed by any of the nodes, and reflects optical signals at other wavelengths. One end of the bypass fiber 308 of the first node 402 is spliced 418 to the input/common 420 of the second node 404, and the other end is spliced 422 to the bypass fiber 426 of the routing array. The express fiber 428 of the first node is spliced 430 to an end of the bypass fiber 432 of the second node 404, and so forth; however, the components may be fabricated as a single unit, thus eliminating or reducing the number of splices. Thus, the bypass fibers of the hybrid switches allow building a loss-balanced optical array with fewer components than are required for an array built with discrete 3-port couplers and 3-port switches and closer inter-channel losses.

While the description above provides a full and complete disclosure of the preferred embodiments of the present invention, various modifications, alternatives, and equivalents will be obvious to those of skill in the art. For example, while embodiments of the invention have been described primarily with reference to optic fibers and dielectric stack WDM filters, other types of waveguides, such as thin-film waveguides, and filters, such as fiber Bragg grating filters, may be used with appropriate isolators, couplers or other devices, such as a wavelength-selective coupler. Similarly, although specific embodiments of optical switches employing mirrors have been described, other types of optical switches could be used. Accordingly, the scope of the invention is limited solely by the following claims.

What is claimed is:

1. A loss-balanced optical routing array comprising:
   a common input waveguide optically coupled to each of a plurality of switchable nodes, each of the plurality of switchable nodes being configurable to a re-insertion path;
   a bypass waveguide coupling a last input port of a last switchable node to a first output port of a first switchable node; and
   an output waveguide optically coupled to each of the plurality of switchable nodes, wherein a node transmission loss between an input port and an output port of each of the plurality of switchable nodes is less than about 2.5 dB and a loss difference between a re-insertion path loss between the common input waveguide and the output waveguide through any node, and a bypass path loss between the common input waveguide and the output waveguide through the bypass waveguide is less than about 3 dB.

2. The loss-balanced optical routing array of claim 1 wherein the difference is less than about 1 dB.

3. The loss-balanced optical routing array of claim 1 further comprising a multi-band filter stub disposed between the last input port and the first output port.

4. A loss-balanced optical routing array comprising:
   a common input waveguide;
   a first switchable node having a first input port coupled to the common input waveguide and having a first output port, the first switchable node being configurable to a first re-insertion configuration;
   a second switchable node having a second input port and a second output port, the second switchable node being configurable to a second re-insertion configuration;
   a third switchable node having a third input port and a third output port, the third switchable node being configurable to a third re-insertion configuration;
   a fourth switchable node having a fourth input port and a fourth output port, the fourth switchable node being configurable to a fourth re-insertion configuration;
   a first intermediate common waveguide coupling the first input port to the second input port;

a second intermediate common waveguide coupling the second input port to the third input port;

a third intermediate common waveguide coupling the third input port to the fourth input port;

a bypass waveguide optically coupling the fourth input port to the first output port;

a first intermediate express waveguide coupling the first output port to the second output port;

a second intermediate express waveguide coupling the second output port to the third output port;

a third intermediate express waveguide coupling the third output port to the fourth output port; and an output waveguide coupled to the fourth output port, wherein a difference between a re-insertion path loss between the common input waveguide through any switchable node and the output waveguide, and a bypass path loss between the common input waveguide and the output waveguide through the bypass waveguide is less than about 3 dB.

5. The loss-balanced optical routing array of claim 4 wherein the first switchable node, the second switchable node, the third switchable node, and the fourth switchable node are add/drop nodes.

6. The loss-balanced optical routing array of claim 4 wherein the re-insertion path loss is between about 1.8–3.4 and the bypass path loss is less than about 0.8 dB.

7. The loss-balanced optical routing array of claim 4 wherein the bypass path loss is about 1.6 dB.

8. The loss-balanced optical routing array of claim 4 wherein the difference is less than about 1.0 dB.

9. The loss-balanced optical routing array of claim 7 further comprising eight splices and wherein the bypass path loss is about 2.4 dB.

10. The loss-balanced optical routing array of claim 4 further comprising a multi-band filter stub disposed between and optically coupled to the fourth input port and the first output port.

11. The loss-balanced optical routing array of claim 4 wherein a first selected channel is coupled from the first input to the first output through no more than two collimators.

12. The loss-balanced optical routing array of claim 4 wherein each of the first node, second node, third node, and fourth node include an input collimator, a first wavelength-selective filter, a second wavelength-selective filter, an output collimator, and an optical switching element capable of being switched into and out of a light beam between the first wavelength-selective filter and the second wavelength-selective filter.

13. A loss-balanced optical routing array comprising:

a common input waveguide;

a first add/drop node having a first input coupled to the common input waveguide and having a first output;

a second add/drop node having a second input and a second output;

a third add/drop node having a third input and a third output;

a fourth add/drop node having a fourth input and a fourth output;

a first intermediate common waveguide coupling the first input to the second input;

a second intermediate common waveguide coupling the second input to the third input;

a third intermediate common waveguide coupling the third input to the fourth input;

a bypass waveguide optically coupling the fourth input to the first output;

a first intermediate express waveguide coupling the first output to the second output;

a second intermediate express waveguide coupling the second output to the third output;

a third intermediate express waveguide coupling the third output to the fourth output; and an output waveguide coupled to the fourth output, wherein a re-insertion path loss between the common input waveguide and the output waveguide includes at least one transmission loss between a node input and a node output and three reflection losses and a bypass path loss includes at least eight reflection losses, the one transmission loss being less than about 2.5 dB and a difference between the re-insertion path loss and the bypass path loss is between about 0–3 dB.

* * * * *